United States Patent [19]

Smith et al.

[11] 4,215,266
[45] Jul. 29, 1980

[54] BAKING OVEN

[76] Inventors: Gilbert L. Smith, 1355 Reber St., Green Bay, Wis. 54308; Gilbert Trick, 888 St. Charles Dr., Green Bay, Wis. 54301; David L. Swanson, 6718 Revere Ave., Wauwatosa, Wis. 53213

[21] Appl. No.: 971,799

[22] Filed: Dec. 21, 1978

[51] Int. Cl.² .............................................. H05B 3/00
[52] U.S. Cl. ................................... 219/413; 219/395; 219/396; 219/398; 219/399; 219/405
[58] Field of Search ............... 219/391, 392, 395, 398, 219/399, 403, 408, 409, 413

[56] References Cited

U.S. PATENT DOCUMENTS

| | | | |
|---|---|---|---|
| 1,392,802 | 10/1921 | Serrell | 219/399 |
| 1,490,243 | 4/1924 | Thornton, Jr. | 219/398 |
| 1,612,065 | 12/1926 | Serrell | 219/399 |

Primary Examiner—B. A. Reynolds
Assistant Examiner—Bernard Roskoski
Attorney, Agent, or Firm—Peter P. Kozak

[57] ABSTRACT

A baking oven having a baking chamber preferably divided into a plurality of baking compartments disposed in a vertical stack separated from one another by a deck and enclosed by a cabinet having an access door. Each such deck comprises top and bottom plates with a space therebetween and a heating element therein spaced from said plates. The deck is provided with a narrow vent to said space across its width adjacent the access door. A sensing bulb or other temperature sensing means of a thermostat is located in the said space with the sensing tip of the sensing means being substantially at said vent. The top surface of the bottom plate is selectively blackened and the heating element is located to provide progressively less heating toward the back of the baking compartments. The top side of the baking chamber is defined by a like deck and the bottom side of the baking chamber is defined by a similar deck which does not have a blackened lower plate.

In operation the heating element of the intermediate deck heats the lower portion of the upper baking compartment to a baking temperature gradient and the upper portion of the next lower baking compartment to a higher browning temperature gradient due to the selectively blackened surface of the bottom plate. The heating element of the top deck heats the upper portion of the uppermost compartment to a browning temperature gradient and the heating element of the bottom deck heats the lower portion of the lowermost compartment to a baking temperature gradient. The thermostats control both these temperature gradients and are promptly responsive to oven door opening due to cool air immediately contacting the sensing means through said vent to maintain uniform oven temperature gradients even though said access door is repeatedly opened during the baking cycle.

In a single baking compartment embodiment, the intermediate decks are omitted and the top and bottom decks heat the upper portion of the baking compartment to a browning temperature gradient and the lower portion of the compartment to a baking temperature gradient and the heating is controlled by the thermostats as described.

3 Claims, 6 Drawing Figures

BAKING OVEN

This invention relates to commercial baking ovens for baking bread and the like.

In general, a commercial baking oven consists of an insulated cabinet having a plurality of vertically disposed baking compartments separated from one another by decks. Access to the baking compartments is usually through a plurality of glass paneled doors so that a particular baking compartment may be opened without disturbing the heat balance in another. Typically the ovens contain two thermostats for each baking compartment, one to control the baking temperature of the lower regions of the baking compartment and the other to control the browning temperature of the upper regions of the baking compartment.

SUMMARY OF THE INVENTION

An object of this invention is to provide a commercial baking oven having a plurality of vertically disposed baking compartments and a suitable access closure such as a single door, multiple doors, glass paneled doors or non-glass doors for a plurality of baking compartments wherein the temperatures in the several baking compartments are maintained at the desired levels regardless of the type of door used and even though the access door is repeatedly opened and closed, for efficient loading and unloading of the baking compartments. Another object is to provide a single baking chamber oven having similar advantages. A further object is to minimize the number of thermostats needed in multiple compartment ovens by having a single thermostat control the lower or baking temperature of an upper compartment and the upper or browning temperature of the next lower baking compartment.

These and other objects and advantages are accomplished by the provision of a novel deck for separating each baking compartment from another, for supporting the baking charge in the baking compartment above, for heating the lower portions of the upper baking compartment to a relatively lower baking temperature gradient and simultaneously for heating the upper regions of the lower baking compartment to a relatively higher browning temperature gradient. Each deck consists of upper and lower plates horizontally mounted on the inner cabinet walls in spaced relation to provide an enclosed space therebetween. The top of the lower plate is provided with a blackened surface which diminishes in area from the front to the back thereof so as to gradually reduce the heat transmission rate through the plate in a pattern generally in the form of an arc about the rear end of the plate and forwardly along its sides in a gradually diminishing pattern substantially to the front thereof. Preferably the blackened pattern is in the shape of a truncated isosceles triangle with the base thereof being located at the access door end of the plate and the truncated end extending toward the rear end of the lower plate. Between the deck plates in spaced relation thereto there is provided an electrical heating element which extends substantially across the transverse extent of the deck and is located nearer the front of the plates which is operative to impart heat uniformly to the plates.

An important feature of the invention is the provision of an elongated vent of predetermined dimensions to the enclosed deck space at the access door side thereof and substantially across the width thereof which preferably enters the deck space vertically, and the location of a temperature sensing means immediately at the vent opening in spaced relation to the deck plates and cabinet walls.

In operation, for a specific temperature control setting, the heat transmission rate through the top plate provides baking heat to the lower portion of the upper baking compartment and the blackened bottom plate permits a greater heat transmission rate to the upper regions of the lower baking compartment, the pattern of the blackened surface effecting a greater heat transmission rate at the access door regions of the oven to compensate for heat losses through the access door so as to provide uniform heating of the baking space across the horizontal extent thereof and the location of the temperature sensing means at the deck vent permits instantaneous response to the cold air entry when the access door is opened so as to maintain uniform temperature levels in the baking compartments when the door is opened.

BRIEF DESCRIPTION OF THE DRAWING

Various objects and advantages will appear from the following detailed description of the invention with reference to the drawings in which.

DESCRIPTION OF PREFERRED EMBODIMENTS

Description of Apparatus

Figure 1:
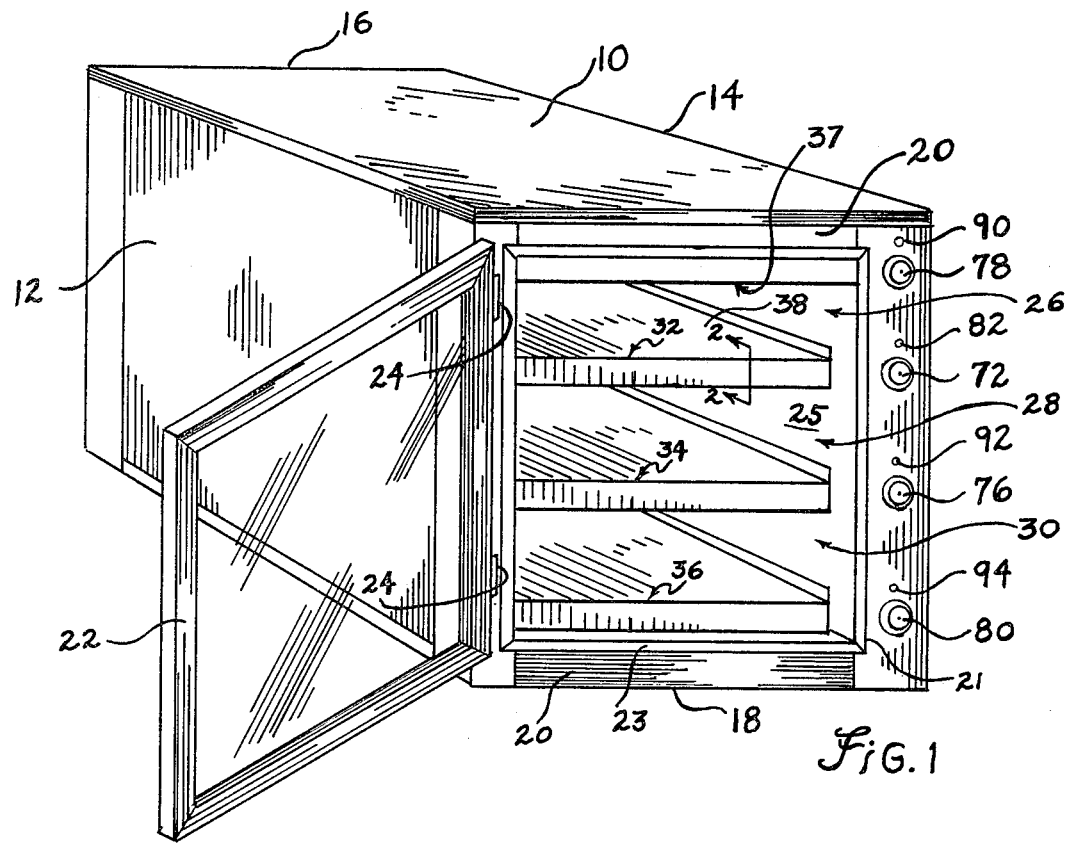
FIG. 1 is a perspective view of a commercial baking oven.

Referring to the drawings FIG. 1 shows in perspective a baking oven simplified for purposes of clear illustration comprising a cabinet having a top 10, sides 12 and 14, a back 16, a bottom 18, and a front side 20 including an access opening 21 having a gasket 23 and a glass paneled door 22 supported by hinges 24 providing closure for the access opening to the baking chamber 25 comprising the baking compartments 26, 28 and 30 disposed vertically over one another and separated by the intermediate decks 32 and 34.

Figure 2:
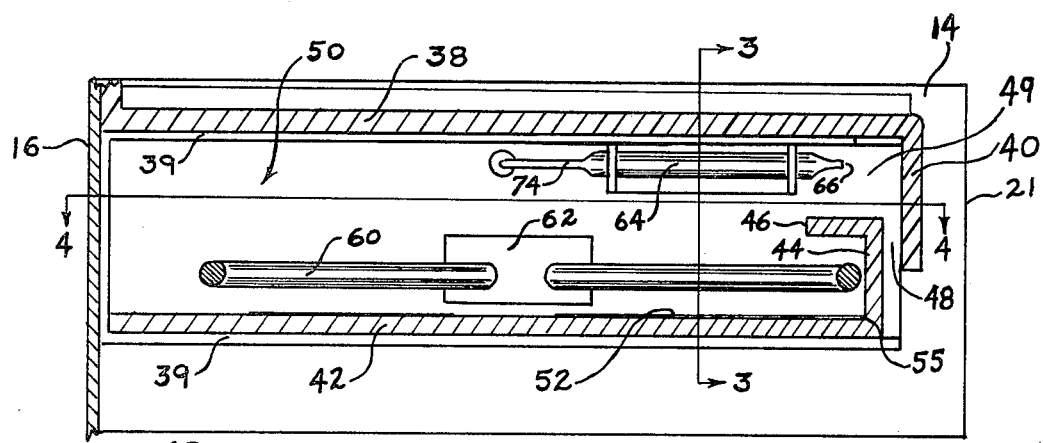
FIG. 2 is a cross-sectional view of a deck comprising spaced plates taken along lines 2—2 of FIG. 1 which separates upper and lower baking compartments.

Each intermediate deck as for example deck 32 as best shown in FIG. 2 comprises a top plate 38, supported by bracket 39 attached to the sides of the cabinet and having a depending flange 40 extending forwardly near to the access opening 21 and a bottom plate 42 spaced from the top plate 38 supported by the bracket 39 and having an upturned flange 44 with a horizontal inwardly turned portion 46. The top plate extends substantially across the width and depth of the baking compartments with the depending flange being located substantially at the baking compartment's access opening 21 and extending laterally across the access opening.

The lower plate likewise extends substantially across the width of the baking compartments but the forward end thereof at the flange 44 extends forwardly a predetermined distance short of the flange 40 of the top plate 38 to provide a vertically disposed vent 48 of predetermined width extending across the width of the deck. The inwardly turned portion 46 of the bottom plate 42 which is located approximately midway between the top plate 38 and the bottom plate 42 to provide a horizontal passage portion 49 of the vent 48 to the interior space 50 between the top plate 38 and the bottom plate 42.

Figure 5:
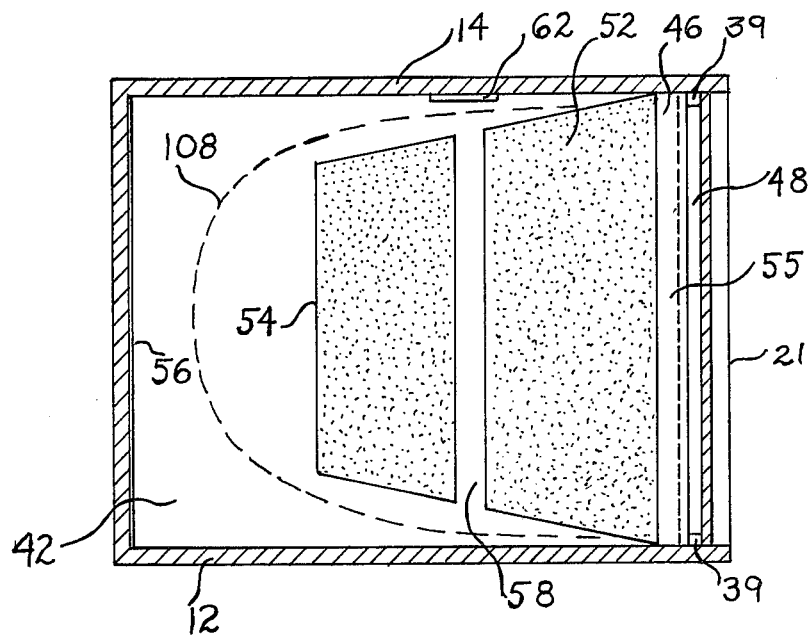
FIG. 5 is the view of FIG. 4 with the heating element removed.

As best shown in FIG. 5 the bottom plate 42 has its upper side blackened by a heat resistant coating 52 in a pattern preferably in the form of a truncated isoceles triangle with the apex thereof being replaced by a plane section 54 substantially paralled to the base thereof and with the base 55 thereof shown in broken lines being located substantially at the flange 44 and the plane section being located a predetermined distance from the rear end 56 of the bottom plate 42. Preferably the blackened pattern 52 is interrupted laterally by an unblackened portion 58 for the purpose to be described hereinafter.

Figure 4:
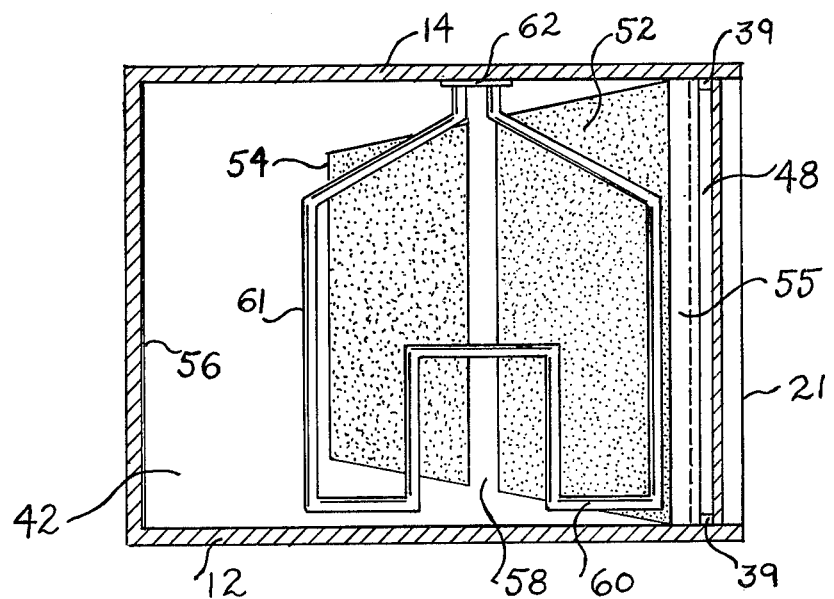
FIG. 4 is top view of the lower deck plate taken along line 4—4 of FIG. 2 showing a blackened surface thereon and the location of the heating element in relation to the lower deck plate.

Between the top plate 38 and the bottom plate 42 is provided an electrical heating element 60 as shown in FIG. 4 which extends substantially across the surface of the bottom plate 42 about the blackened coating 52 and rearwardly beyond the plane section 54 thereof. Vertically the heating element 60 is located substantially midway of the top plate 38 and the bottom plate 42. The element 60 is electrically connected to the 3-prong, 250 volt plug 62 built into the wall 14 of the oven cabinet.

Figure 3:
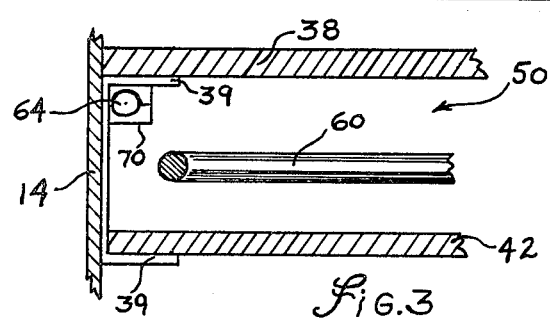
FIG. 3 is a fragmentary cross sectional view taken along line 3—3 of FIG. 2 showing the location of a temperature sensing bulb in reference to the cabinet wall and the upper end lower deck plates.

Within the space 50 between the plates 38 and 42 is preferably provided a fluid filled heating sensing bulb 64. As shown in FIG. 2 the bulb is located so that the tip 66 thereof is located substantially within the horizontal vent portion 49 and in close proximity to the vent portion 48 and is spaced from the inner side of the lateral wall 14 of the oven and supported thereon by a bracket 70 attached thereto as best shown in FIG. 3. The bulb 64 is connected to the thermostat 72 by means of the tube 74 in the usual manner.

The deck 34 is identical to the deck 32 described above and is controlled by the thermostat 76 shown in FIG. 1. The baking chamber 25 or upper baking compartment 26 is provided with a top deck construction 37 which is identical to the deck 32 described above except that the cabinet ceiling is used as the upper plate of the deck. Preferably the cabinet ceiling is provided with a depending flange (not shown) which cooperates with the upturned flange of the lower plate to provide the vent. The deck construction 37 is controlled by the thermostat 78. The bottom deck 36 of baking chamber 25 or the lowest baking compartment 30 is similar to the deck 32 and differs in that the bottom wall of the baking compartment serves as the bottom plate of the deck and is not blackened. In the bottom deck it has been found the flange on the upper plate cooperates with bottom wall of the oven chamber to provide a suitable vent and a flange on the bottom wall is not essential. The bottom deck 36 is controlled by the thermostat 80.

Figure 6:
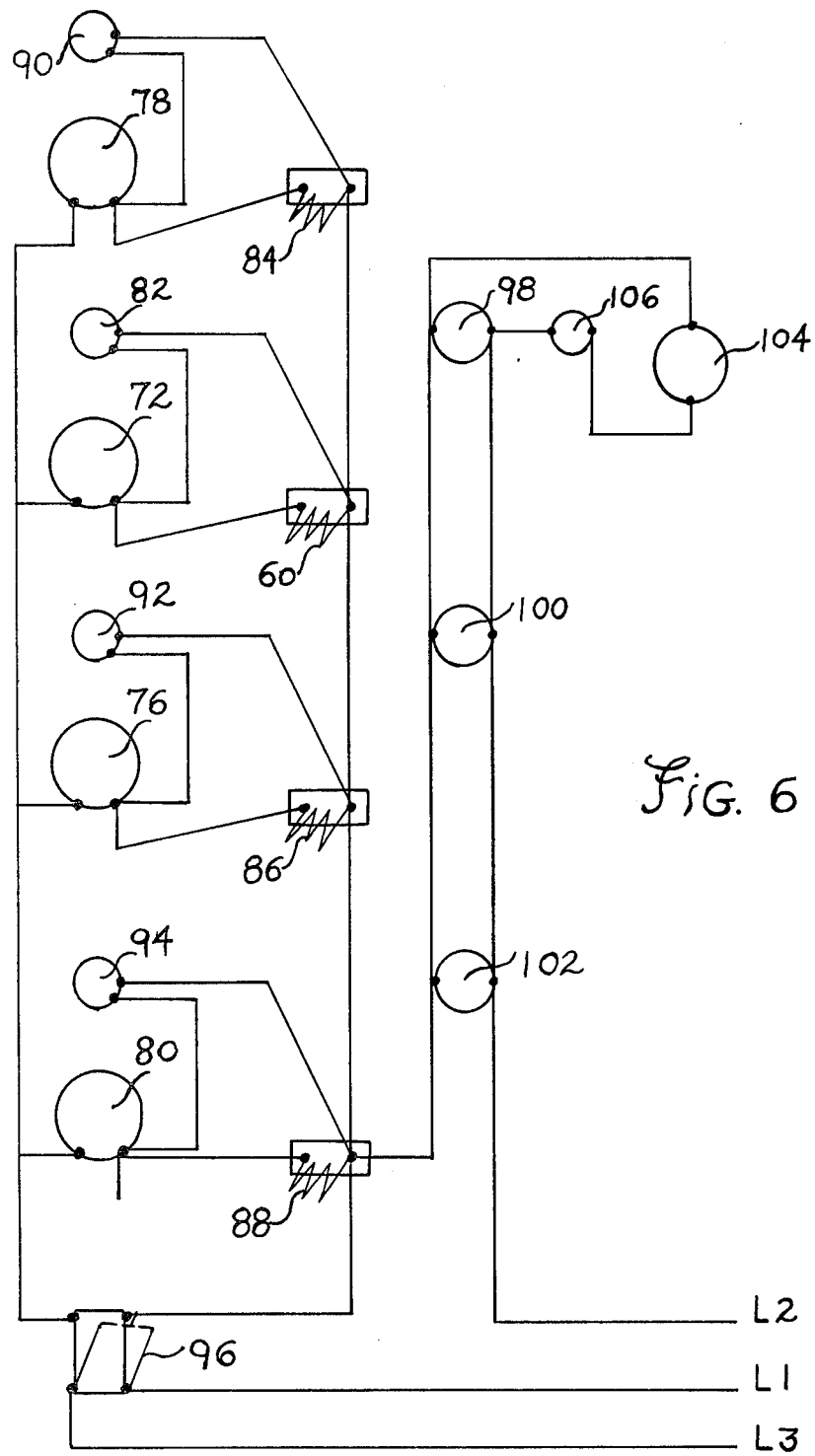
FIG. 6 is a schematic electrical diagram.

FIG. 6 shows an electrical wiring diagram applicable to the oven described. The deck 32 is controlled by the thermostat 72 connected in series with the heating element 60 across the 250 volt leads L 1 and L 3. A pilot light 82 is connected across L 1 and the L 1 side or electrical contact of the thermostat to indicate if the heating coil is energized. Similarly the thermostats 78, 76 and 80 relating to the decks 37, 34 and 36 are connected in series with the heating elements 84, 86 and 88 respectively across L 1 and L 3 and the pilot lamps 90, 92 and 94 are similarly provided.

A 30 amp. two pole switch 96 is provided across L 1 and L 3 for de-energizing or energizing the oven. Preferably the appliace lamps 98, 100 and 102 connected across L 1 and L 2 are provided for lighting up each of the baking compartments 26, 28 and 30 respectively. A timer 104 and alarm 106 are likewise connected across L 1 and L 2 for controlling the baking cycle.

Description of Operation

Referring again to FIG. 1 the intermediate deck 32 is operative to heat the lower half portion of the upper compartment 26 and the upper half portion of the lower baking compartment 28. Similarly the deck 34 is operative to heat the upper half portion of the baking compartment 30 and the lower half portion of the baking compartment 28. The base deck 36 is operative to heat the lower half portion of the baking compartment 30 and the top deck 37 is operative to heat the upper half portion of the baking compartment 26.

The heating of the baking compartments and temperature control may readily be understood in the following description relating to deck 32 as shown in FIGS. 1 and 2.

The top plate 38 is formed of a bright or polished high temperature aluminum sheet about 3/16 inch in thickness having the commercial designation 3003, H—14 hardness. The bottom plate 42 is formed of a 3/16 inch high temperature aluminum sheet having the commercial designation 5052, H—34 hardness which has somewhat higher hot strength properties to withstand the higher temperatures to which this plate is heated. These plates are preferably spaced about two inches apart.

The bottom plate 42 is provided with the blackened coating 52 to enable it to transmit heat from the heating element 60 between the plates at higher rate than the top plate so that the bottom plate 42 is heated to a temperature of about 100° more than the top plate 38. The gap 58 in the coating 52 is preferably made to provide a transverse area or strip of lower temperature and hence greater strength in oven operation to prevent sagging of the bottom plate under heated conditions.

To calibrate the oven or to establish controlled baking conditions in the baking compartments a suitable or desired temperature of 375° F. at a point midway between the decks as for example of the baking space 28 between the decks 32 and 34 is assumed. All of the heating elements in the decks 37, 32, 34 and 46 are energized and heated to the same temperature to establish the baking temperature midway of the baking compartment 28 of 375° F. as determined by a pyrometer. In the instant example this results in a top plate 38 temperature of 450° F. as determined by pyrometer means. By reason of the construction of the deck 32, the bottom plate 42 is heated to a temperature of 550° F. The thermostat 72 is then set to read 375° F. Other baking compartment temperatures are then selected to calibrate the thermostat 72. The other thermostats 78, 76 and 80 are calibrated in a similar manner. Accordingly as calibrated the thermostat dial is used to establish the baking temperature midway of the decks. Preferably the thermostats, as for example 72, are adjusted to cycle or de-energize the heating elements at a top plate 38 temperature of 480° F. and to energize the heating elements at a top plate temperature of 450° F.

It has been found that if the entire surface of the bottom plate 42 is blackened the top areas of the bread loaves will burn or blacken in an arc 108 shown in broken lines in FIG. 5 at the rear portions of the oven compartment 28. It has also been found that uniform baking and browning of the bread loaves is accomplished by blackening the bottom plate 42 in the truncated isoceles triangle pattern described above. The dimensions of this blackened surface is determined experimentally and emperically. Thus, for example, for a plate 42 which is 28 inches deep and 24 inches wide, the distance between the edge 56 of the plate and the section 54 of the blackened pattern 52 as indicated in FIG. 4 is about six inches with an acceptable range of six to ten inches. A suitable coating material is the commercial coating known as Bar-B-Que Black sold by Rust-Oleum Corporation. It has also been found that the top plate 38 provides uniform heating of the lower portion of the upper baking compartment without any surface modification of portions thereof. As shown in FIG. 4 the heating element 60 is located markedly forwardly of the rear of the oven compartment to improve uniform heating since the rear portions of the baking compartments are better insulated than the forward portions due to the relatively poor insulating capabilities of the glass paneled door if one is used and the heat loss due to opening and closing of the door. In the preferred embodiment disclosed wherein the blackened plate 42 is 28 inches deep the rearward portion 61 of the heating element 60 is about nine inches from the rear edge of the plate.

The establishment of the top and bottom plate temperatures as above indicated results in a desired temperature of about 375° F. vertically midway of the baking compartment with the upper portion of each baking compartment having a temperature gradient ranging from about 375° F. to about 550° F. in an upward direction to provide a suitable browning temperature and with the lower half having a temperature gradient ranging from about 450° F. at the bottom thereof to about 375° F. midway of the compartment to provide a suitable baking temperature.

An important feature of the invention is the location of the tip 66 of the temperature sensing bulb 64 within or in close proximity as for example within one-fourth inch of the vertical vent portion 48 and in the vent air flow path. When the oven door is opened cool air is immediately drawn into the vertical vent portion 48 and to the horizontal vent portion 49 so as to immediately impinge on the bulb tip 66 to cause the heating element 60 to be immediately energized and hence compensate for heat loss due to opening of the door. In deck construction wherein the horizontal flange portion 46 is omitted the sensing tip is located substantially in the path of the air flow of the vertical portion of the vent. Likewise where only one vertical flange is used as in the case of the bottom deck the sensing tip is likewise located in the path of the vent air flow immediately at the vent. The bulb 64 is spaced from the wall 68 as shown in FIG. 3 so that it senses the air temperature rather than wall temperature and is located close to the top plate preferably about ⅛ inch so that is is not overheated. Preferably the thickness or transverse dimension of the vent 48 is about ⅜ inch. The thickness of the vent 48 is determined empirically so as to permit the bulb tip to sense both the deck temperature and the air flow through the vent when the door is opened. It has been found that if the vents are too narrow the bulb tip will sense predominately the deck temperature and if too wide it will sense predominately the ambient air and in either case the thermostat control will not provide optimum uniform temperature gradients. The location of the temperature sensing bulb within the deck and behind a flange of a deck plate protects it from physical damage or mislocation in the use of the oven. While the use of a fluid filled bulb is preferred as the sensing means, other devices such as a thermocouple may be used.

It may readily be seen from the foregoing that the invention described is effective to maintain uniform heat in the baking compartments to a high degree even though the access door is open from time to time and a glass paneled door is used which affords markedly inferior insulation than other walls of the oven. Further the invention eliminates the need to provide separate doors for the several baking compartments which would otherwise be necessary when it is desired to load or unload baking compartments at different times. Another important advantage of the invention is that a single thermostat is operative to control both the top and bottom heats of each of the intermediate decks so that in effect a single thermostat is used to control both the top and bottom heat of the intermediate baking compartments.

While this invention is primarily concerned with multiple baking compartment baking ovens, it is also applicable to a baking oven having a single baking compartment or chamber. In such embodiment the intermediate decks are omitted and only the top and bottom decks are used with the baking chamber being suitably dimensioned to permit the top deck to provide the upper portion of the baking chamber with a browning temperature gradient and the bottom deck to provide the lower portion of the baking chamber with the baking temperature gradient.

It will be apparent that numerous modifications and changes of the invention described may be made by those skilled in the art without departing from the principles and spirit of the invention.

We claim:

1. A baking oven comprising:
   a baking chamber encased in a cabinet including top, bottom and back walls and a front wall having a front access opening and a door for closing said access opening,
   a top deck defining the upper side of said chamber and a bottom deck defining the bottom side thereof,
   each of said decks comprising upper and lower horizontally disposed plates in spaced relation forming an enclosed space therebetween and each deck having means adjacent said access opening to form a relatively narrow vent across the width thereof providing controlled air flow access to said space,
   an electrical heating element located between said plates of each of said decks and extending across the extent thereof so as to provide substantially uniform heating thereacross,
   a temperature sensing means located within said space of each deck near to a said wall thereof with its sensing tip being located substantially at said vent and a thermostat including a switch associated with each of said decks operatively connected to said sensing means and to said heating element, the bottom plate of said top deck being partially blackened on its upper surface in a configuration so as to provide an unblackened portion extending generally in the form of an arc increasing in area from front to back of said chamber, the heating element of said top deck being operative to uniformly heat the upper portion of said baking chamber through said blackened plate to a browning temperature gradient, the heating element of said bottom deck being operative to heat the lower portion of said baking chamber to a lesser predetermined baking temperature gradient, said sensing tips of said top and bottom deck sensing means being operative to sense both the deck temperature in which it is contained and the ambient air temperature entering said decks through said vents and said sensing means of each of said decks being operative to actuate said thermostat switch means associated therewith to maintain said temperature gradients and being promptly responsive to cooler air entering said vents to maintain said temperature gradients when said door is opened.

2. A baking oven comprising:

a baking chamber encased in a cabinet including top, bottom and back walls and a front wall having an access opening and a door for closing said access opening, a top deck defining the top side of said chamber, a bottom deck defining the bottom side thereof and at least one intermediate deck dividing said chamber into at least two baking compartments, each of said decks comprising upper and lower horizontally disposed plates in spaced relation forming a space therebetween and each having means partially enclosing the side thereof adjacent said access opening to form a relatively narrow vent across the width thereof proving controlled airflow access to said space, an electrical heating element located between said plates of each of said decks and extending substantially across the extent thereof so as to provide substantially uniform heating of said decks, a temperature sensing means located in said space of each deck near to a wall of said chamber with its sensing tip located substantially at said vent and a thermostat including a switch associated with each of said decks operatively connected to said sensing means of each of said decks and to the heating element thereof, the bottom plate of said top and intermediate decks being partially blackened on its upper surface with a configuration so as to provide an unblackened portion extending generally in the form of an arc progressively increasing in area from front to back of said chamber, the heating element of said top deck being operative to uniformly heat the upper portion of the uppermost baking compartment through said blackened plate to a browning temperature gradient, the heating element of said next lower intermediate deck being operative to heat the lower portion of the next upper compartment to a lower baking temperature gradient and to heat the upper portion of the next lower compartment to a browning temperature gradient, the heating element of said bottom deck being operative to heat the lower portion of the lower most baking compartment to said lesser baking temperature gradient, said sensing tip of said decks being operative to sense both deck temperature and ambient air temperature entering said decks through said vents and said sensing means being operative to actuate said thermostat switch means to maintain said temperature gradients and being promptly responsive to the cooler air entering said vents to maintain said temperature gradients when said door is open.

3. A baking oven comprising:

a baking chamber encased in a cabinet including top, bottom and back walls and a front wall having a front access opening and a door for closing said access opening, a top deck defining the top side of said chamber, a bottom deck defining the bottom side thereof and at least one intermediate deck dividing said chamber into at least two baking compartments, each of said intermediate decks comprising upper and lower plates in spaced relation forming a space therebetween with the top plate extending near to said access opening and having a vertically extending flange at its front edge at said access opening and with said bottom plate extending to a point short of said access opening and having a vertically extending flange at its front edge, said flanges cooperating to form a vertically disposed elongated vent to said space near to said access opening, said top and bottom decks comprising upper and lower plates in spaced relation with at least one of the plates having a vertical flange forming a vent in cooperation with the other plate, the said lower plate of said top and intermediate decks being partially blackened at its upper surface substantially in the configuration of a truncated isoceles triangle with the apex thereof being replaced by a plane section substantially parallel to the base thereof with the said base being located at the access opening side of said bottom plate and said plane section being located a predetermined distance from the back of the baking chamber, a heating element located between said plates of said decks having a loop-like configuration extending substantially across the extent of said plates and rearwardly of said plane section in said top and intermediate decks, a temperature sensing bulb disposed between the plates of each deck spaced from said chamber walls and in near proximity to the said top plate of each deck with its sensing tip being located substantially at said vent and a separate thermostat means including a switch operatively connected to each of said bulbs and each of said heating elements, the heating element of said top deck being operative to uniformly heat the upper portion of the uppermost baking compartment through said blackened plate thereof to a browning temperature gradient, the heating element of said next lower intermediate deck being operative to heat the lower portion of the next upper compartment to a lower baking temperature gradient and to heat the upper portion of the next lower compartment to a browning temperature gradient, the heating element of said bottom deck being operative to heat the lower portion of the lowermost baking compartment to said lesser baking temperature gradient, said sensing tips of said bulbs being operative to sense both deck temperature and ambient air temperature entering said decks through said vents and said thermostat means being operative to actuate said thermostat switches to maintain said temperature gradients and being promptly responsive to cooler air entering said vents to maintain said temperature gradients when said door is open.

* * * * *